Jan. 9, 1962 H. ERDMANN 3,015,882
RETAINING-RING ASSEMBLY TOOLS
Filed June 2, 1959 2 Sheets-Sheet 1
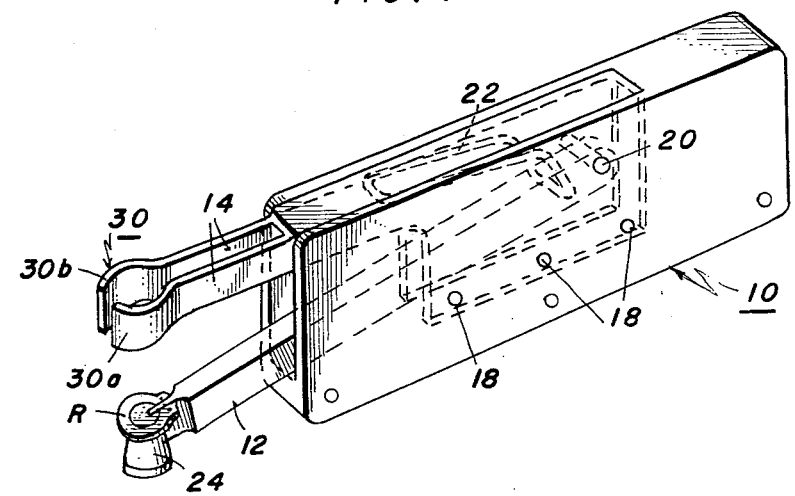
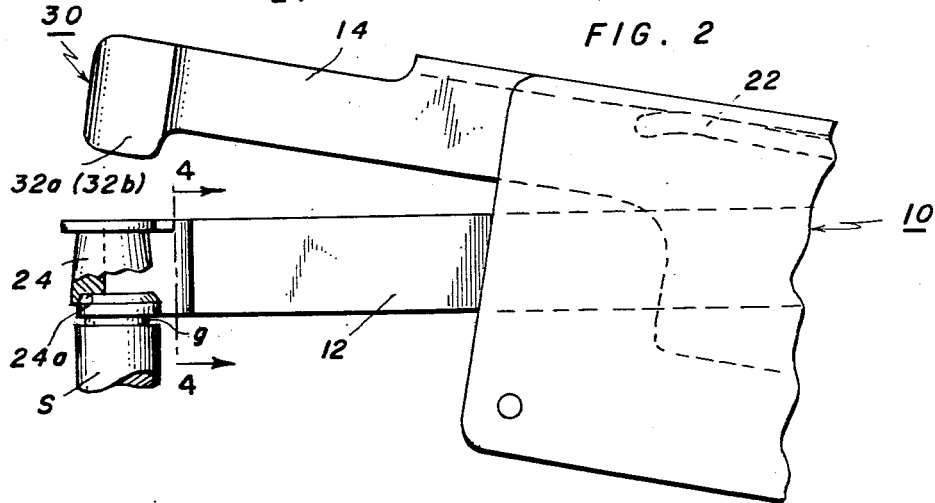
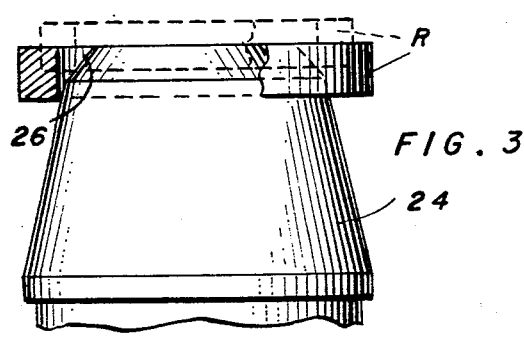
INVENTOR.
HANS ERDMANN
BY
ATTORNEY Jan. 9, 1962 H. ERDMANN 3,015,882
RETAINING-RING ASSEMBLY TOOLS
Filed June 2, 1959 2 Sheets-Sheet 2
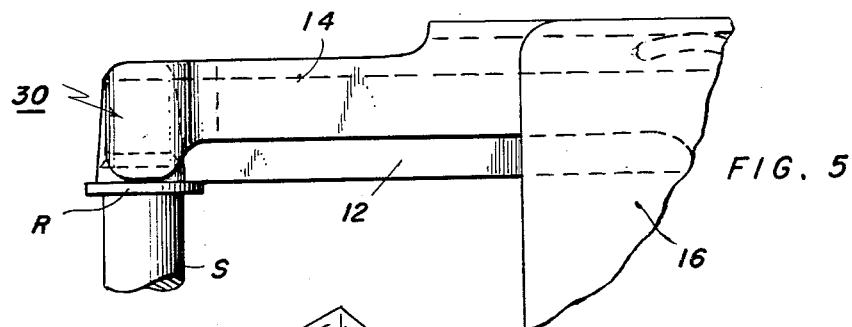
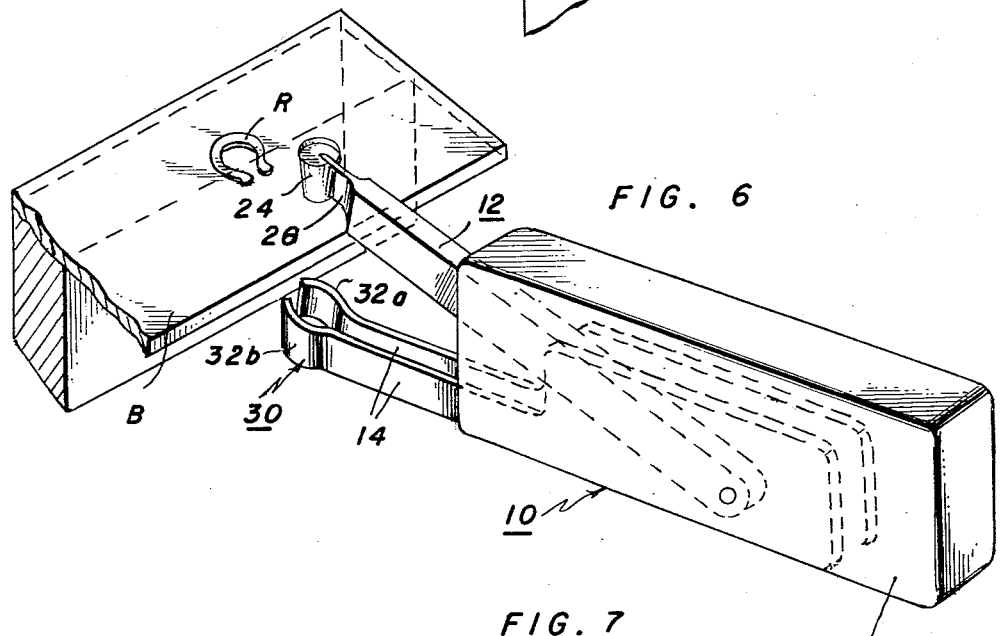
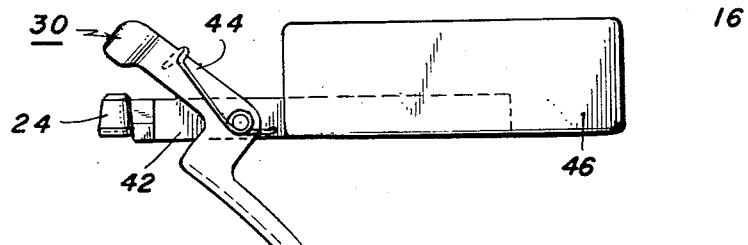
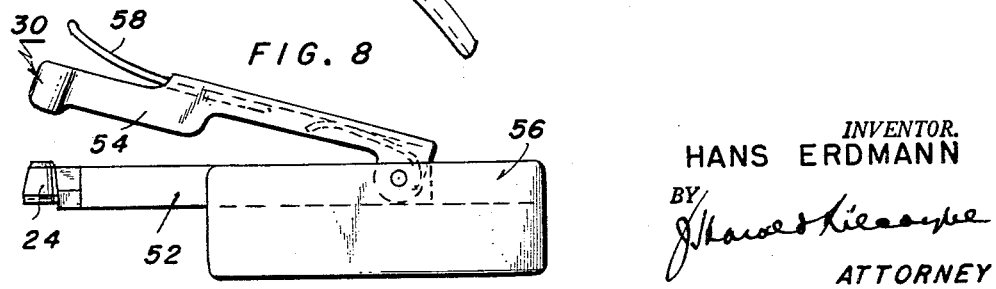
INVENTOR.
HANS ERDMANN
ATTORNEY

United States Patent Office 3,015,882
Patented Jan. 9, 1962

3,015,882
RETAINING-RING ASSEMBLY TOOLS
Hans Erdmann, Maplewood, N.J., assignor to Waldes Kohinoor, Inc., Long Island City, N.Y., a corporation of New York
Filed June 2, 1959, Ser. No. 817,668
8 Claims. (Cl. 29—229)

This invention relates to improvements in retaining-ring assembly tools, and more particularly in a hand tool for assembling external split spring retaining rings in grooves provided therefor in shafts, pins or similar workpieces, whereon they are adapted to form an artificial locating shoulder for machine parts such as bearings, gears, etc.

In my prior United States Patents No. 2,814,858 and No. 2,814,859 I have disclosed apparatus by which split spring retaining rings are automatically moved singly from a hopper to a conical mandrel arranged coaxially with respect to a cylindrical workpiece, then are pushed over the mandrel by a plunger in manner as to spread or expand the ring to the diameter of the workpiece, and finally are pushed along said workpiece to the location of their grooves wherein they spring-seat themselves. While capable of performing ring assembly operations successfully, such apparatus is expensive and complicated and hence is not well suited to applications involving the assembly of a limited number of rings at one time or to the occasional ring assembly.

For these latter applications there is a real need for a small hand tool, preferably a pliers-type tool that can be easily operated and by which the assembly of individual rings in their grooves can be facilitated, as compared to ring assembly by the conventional hand tool. In explanation, the conventional pliers-type tool used for this purpose has working points which are required to be inserted in relatively small holes provided in the free ends of the ring, in order first to grasp and thereupon to spread the ring over the workpiece. This procedure of inserting the tool points into small holes is of course laborious and time-consuming, particularly when working with the smaller-size rings, and hence use of the conventional pliers-type ring-assembly tool has persisted to date largely because of the lack of a better and more efficient one.

Broadly stated, it is a principal object of this invention to provide a hand tool that facilitates the assembly of external split spring retaining rings on grooved shafts, pins and similar cylindrical workpieces, as compared to the conventional hand tools serving similar function, yet is simple in principle and operation and economical in construction.

Another important object of the invention is to provide a hand tool as aforesaid that in one operation expands a ring to be assembled and moves it to proper position along a grooved shaft as enables the ring to spring-seat itself in its groove.

Another major object of the invention is the provision of an improved, easily operated and dependable hand tool of the pliers type for assembling external split spring retaining rings on grooved shafts, pins and similar workpieces.

An additional object of the instant invention is the provision of an improved pliers-type hand tool as aforesaid which is also capable of picking up a ring to be assembled from a flat surface in simple, highly effective manner.

A further object of this invention is to provide a tool for assembling external split spring retaining rings on cylindrical workpieces, which is constructed and arranged so that it may be easily carried about on the person of the workman and is particularly designed to perform single ring-mounting operations by hand as and when required.

A further and more specific object of the invention is the provision of a hand tool as aforesaid, which is capable, in the first instance, of picking up a ring to be assembled from a flat surface and thereupon, responsive to simple pivotal movement of pliers-type handle or arms, of spreading said ring over and moving it along a grooved shaft or similar workpiece to the plane of its groove, while at the same time maintaining said ring in fixed angular position.

The above and other objects and advantages of a pliers-type hand tool for assembling split or open-ended spring retaining rings on grooved shafts according to the invention will appear from the following detailed description thereof, in which reference is made to the accompanying drawings illustrating variant structural forms of such a tool, in which—

FIG. 1 is a perspective view of one form of such a tool shown in its upright but open or inactive position, the view further illustrating a ring to be assembled disposed in the so-called "assembly-ready" position on the working end of one of the plier arms;

FIG. 2 is an enlarged broken-away side elevation, in partial section, of the hand tool shown in FIG. 1, which illustrates its pliers-type construction and its positioning with respect to a shaft or similar workpiece preparatory to performing a ring-assembly operation thereon;

FIG. 3 is an enlarged, broken-away detail view illustrating the preferred configuration of the smaller-diameter end of the spreader means provided on one tool arm, as enables the tool to pick up a ring to be assembled and to hold said ring in the assembly-ready position thereon;

FIG. 4 is a section taken along line 4—4 of FIG. 2;

FIG. 5 is a view similar to FIG. 2, illustrating the tool in its fully closed position in which it has completed assembly of a ring in a shaft groove;

FIG. 6 is a perspective view of the tool turned to an inverted position, which illustrates the manner in which it is held in picking up a ring to be assembled lying on a flat surface such as a table or bench; and FIGS. 7 and 8 are side views illustrating different structural forms which a pliers-type hand tool for assembling external split retaining rings according to the invention may take.

Referring to the drawings in detail, a tool 10 for assembling external split spring retaining rings on grooved shafts or similar cylindrical workpieces as herein proposed comprises, according to the FIGS. 1–6 form thereof, a pair of pivotally related companion arms 12, 14, of which arm 14 is immovably affixed to a handle member or frame 16 as by rivets 18 so that its free end projects therefrom as shown, and arm 12 is pivotally connected at its inner end to said handle member as by pivot pin 20 so that its outer or free end projects therefrom in generally parallel relation to the arm 14. Suitable biasing means such as a leaf spring 22 operative between said arms 12, 14 normally urges them to their relatively separated or tool-open position. Preferably, the fixed arm 14 is of downwardly open, channel construction whereby the companion arm 12 shown to have bar section may nest therewith when the arms are moved to their closed position shown in FIG. 5. As will be discussed hereinafter, other arm-handle and arm-mounting arrangements may be employed, so long as they provide for the free or working ends of the arms moving towards and away from one another in the same plane.

Referring to FIGS. 2 and 3 in particular, the working end of the arm 12 is fashioned as or mounts a ring spreading means 24 having the form of a truncated or frusto-conical head or mandrel arranged with its axis generally normal to said arm 12 and with its smaller-diameter end upwardly disposed. Preferably, said smaller-diameter end has diameter which is slightly larger than the internal diameter of the rings to be assembled in the unstressed state thereof, and the head tapers to its larger-diameter end which has diameter corresponding substantially to the diameter of the shaft on which the ring is to be assembled. The axial length of the head is such as to insure a gradual, controlled spreading of a ring as it is moved axially along same.

To facilitate positioning of a ring on the spreading head 24, the corner between its upper portion and top end face may be chamfered as at 26, thus to provide a relatively sharply beveled portion leading to the spreading head proper. As seen in FIG. 3, the diameter of the smaller end of the chamfer 26 is somewhat less than the inner-edge diameter of the ring to be assembled, which is indicated in the unstressed state in broken lines and in slightly spread state in full lines, and the depth of the chamfer preferably is slightly less than the axial thickness of said ring. Such an arrangement provides for the head 24 frictionally gripping the ring along its inner edge either when a ring is placed by hand on the smaller diameter end of the head and then pushed a very small distance therealong by finger pressure as effects limited spreading of the ring, or when, with the tool inverted as in FIG. 6, the chamfered smaller-diameter end of the head 24 is pushed into the opening of an untensioned ring disposed flat on a supporting surface.

As best seen in FIGS. 4 and 6, the ring spreading head 24 is connected to its carrying arm 12 proper by a narrow, blade-like neck 28, whose maximum width is such that it may be accommodated in the gap between the open ends of the ring to be assembled. Preferably, and referring to FIG. 4, the upper edge portion 28a of said neck has double-wedge section, as results in its upper edge being formed as a knife edge. Thus, not only may said edge portion freely enter a small ring gap but also it has some play therein as facilitates the spreading head picking up a ring to be assembled from a supporting surface as in FIG. 6. Moreover, said neck 28 may be formed with less exacting tolerances than if it had to have throughout its full depth a width corresponding to that of the usually tiny ring gap.

The aforesaid companion arm 14 is preferably bifurcated at its working end and terminates in spaced semi-cylindrical forks 30a, 30b which together define a part-tubular or ring-form pusher head generally designated 30. Preferably, the aforesaid forks possess limited radial resiliency whereby they may spread and contract slightly and they are moreover radiused so that, when the tool arms are brought to their closed position as in FIG. 2, they move axially along the spreader head 24 while more or less tightly encircling same. It will be observed here that during the course of such movement the lower edges 32a, 32b of said forks bear on the upper face of a ring to be assembled which has previously been related to the spreader head, as earlier explained in connection with FIG. 3, and causes said ring to spread by an amount such that its inner diameter corresponds substantially with that of the grooved shaft to which said ring is to be assembled.

While the operation of the ring assembly tool as described will undoubtedly be clear from the above, it is summarized as follows: An external split spring retaining ring to be assembled (corresponding to that designated R in the several views) is either placed by hand on the smaller end of the spreader head 24 as in FIG. 3, or is picked up by the tool following its inversion by pressing the chamfer 26 of said smaller-diameter end of said spreader head into the opening of a ring lying flat on a supporting surface or bench B, as in FIG. 6. In either case, the ring is spread sufficiently so that it secures itself by friction to the smaller-diameter end of said spreader head, and hence the tool is now conditioned to perform an assembly operation on said ring held in the "assembly-ready" position therein as aforesaid. It will be understood that regardless of whether the ring R is placed by hand or picked up by the tool, the ring and tool must always be so oriented with respect to one another that the knife-edged neck 28 is aligned with the ring gap, since otherwise it would be impossible as a practical matter to shift the ring axially along the spreader head.

Thereupon, the tool is related to the grooved shaft on which ring assembly is to be effected (herein designated S). As seen in FIGS. 2 and 5, such entails moving the tool against the shaft to a position in which the larger-diameter end of the spreader head 24 physically abuts the end face of said shaft, and in which the spreader head and shaft are in more or less precise axial alignment. To insure this alignment, the larger-diameter end face of the spreader head may be cupped out or recessed to receive the shaft end, as indicated at 24a (FIG. 2).

Finally, the tool arms 12, 14 are brought to closed position by simple hand pressure applied to the tool handle 16. Such of course results in the push head 30 lowering on the ring R and pushing it axially (downwardly) along the spreader head until ultimately it arrives at the larger-diameter lower end thereof, as results in the ring being spread the amount such that its inner diameter corresponds to the diameter of said shaft S. Final closing movement of the arms strips the spread ring from the spreader head 24 and moves it on to the shaft end to the plane of the shaft groove g. Upon reaching the latter, the ring snaps into the groove and the tool may now be retracted, since it has completed its operation.

As explained in the foregoing, various arm-handle and arm-mounting arrangements are possible. Referring to FIG. 7, such illustrates one such modified tool arrangement wherein the tool arms 42, 44 operate similarly to the arms of a crossed arm or handle-type of pliers. Also differing in detail from the FIGS. 1–6 form of tool, the arm 42 carrying the spreader head (corresponding to the aforesaid spreader head 24) is immovably affixed to the handle or frame member 46.

FIG. 8 illustrates yet another structural form of tool operating on the same principle as above described. More particularly, the arms 52, 54 are end connected as in the FIGS. 1–6 form, but the arm 54 carrying the pusher head (corresponding to the aforesaid pusher head 30) lies wholly without the handle or frame member 56, of course excepting its hub portion by which it connects to the companion arm 52. Also, said arm 54 may be provided with a finger-piece 58 which facilitates closing of the tool, since the tool may now be closed with thumb pressure in addition to hand pressure exerted on the relatively inner ends of the tool arms.

From the above, it will be appreciated that the herein illustrated and described apparatus for assembling external open-ended or split spring retaining rings on grooved shafts according to the invention meets the objectives therefor as outlined above. However, as many changes could be made in carrying out the above constructions without departing from the scope of the invention, it is intended that all matter contained in the above description or shown in the accompanying drawings shall be interpreted as illustrative and not in a limiting sense.

I claim:

1. A pliers-type hand tool for assembling external split retaining rings having a gap between their free ends on grooved shafts and like workpieces comprising a pair of pivotally interconnected elongate arms having cooperating working ends which are movable towards and away from one another in a common plane, one working end including a ring spreading head in the form of a truncated cone whose smaller diameter end is substantially equal to the inner unstressed diameter of a ring to be assembled and whose larger diameter end is equal to the diameter of the shaft on which said ring is to be assembled and being adapted to receive and spread said ring to the diameter of said shaft, responsive to axial movement of the ring along the length of said head, said spreading head being connected to its carrying arm by a blade-like neck having narrow width enabling it to enter the gap between the open ends of the ring being spread, the other working end including ring pushing means adapted to exert push on one face of said ring placed on the smaller diameter end of said head in direction as to move same axially along said spreading head toward the large diameter end thereof in accordance with movement of said working ends towards one another, the construction and arrangement being such that by positioning the tool so that said spreading head abuts and is coaxial with said grooved shaft and thereupon moving said working ends towards one another, said pushing means pushes the ring axially along and thence strips it from said spreading head, thereby to spread the ring to shaft diameter and thereupon transfer same to the shaft for movement therealong to the plane of the shaft groove.

2. A pliers-type hand tool according to claim 1, wherein the ring spreading head and the ring pushing means are each arranged with its axis substantially normal to its carrying arm.

3. A pliers-type tool according to claim 1, wherein said spreading head is provided at its smaller diameter end with a chamfer having effective diameter and slope enabling said end to enter the opening of said ring when the latter is laid flat on a supporting surface and thereupon to slightly spread said ring as results in the ring frictionally securing itself to said head in an assembly-readiness position thereon.

4. A pliers-type tool according to claim 1, wherein the smaller-diameter end of the spreading head terminates in an annular chamfer of effective diameter and slope which enables the head when its said smaller-diameter end is pressed into the opening of the ring to be assembled then positioned flat on a supporting surface to pick up said ring consequent to the wedging action of the chamfer on the ring inner edge.

5. A pliers-type tool according to claim 1, wherein said ring-pushing means comprises a generally tubular ring pusher head adapted to closely encircle and move axially along said spreading head with movement of said working ends towards one another, thereby to impart corresponding axial movement of the ring placed on the smaller diameter end thereof as aforesaid along said spreading head.

6. A pliers-type tool according to claim 1, wherein said ring-spreading head and said ring pushing means are each arranged with its axis substantially normal to its carrying arm, and wherein said ring pushing means comprises a generally tubular head adapted to closely encircle and move axially along said spreading head with movement of said working ends towards one another, thereby to impart corresponding axial movement of the ring placed on the smaller diameter end thereof as aforesaid along said spreading head.

7. A pliers-type hand tool for assembling external split spring retaining rings on grooved shafts and like cylindrical workpieces comprising a pair of pivotally interconnected elongated arms, said arms being provided with cooperating working ends which are movable toward and away from one another in a common plane, one working end including both ring pick-up and ring spreading means for first picking up a ring to be assembled having an inner unstressed diameter less than the diameter of the shaft on which said ring is to be assembled and thereupon for spreading said ring to a diameter substantially equal to the diameter of said shaft responsive to axial movement of the ring therealong, the other working end including ring pushing means for exerting axial push on a face of said ring in direction as to move same axially along said spreading means in accordance with movement of said working ends towards one another, the construction and arrangement being such that the pick-up means effects pick-up of a ring to be assembled and secures it on said spreading means in position to be acted on by said push head solely by movement of said spreading means against said ring then resting face-up on a supporting surface.

8. A tool according to claim 7, wherein said ring pick-up means comprises a chamfer on the end of the spreading means disposed adjacent said pushing means.

References Cited in the file of this patent
UNITED STATES PATENTS 2,510,206    Barkan et al.    June 6, 1950
2,807,078    Erdmann    Sept. 24, 1957